Aug. 16, 1927.
H. TAYLOR
IMPACT BAR FOR AUTOMOBILE BUMPERS
Filed Jan. 31, 1927
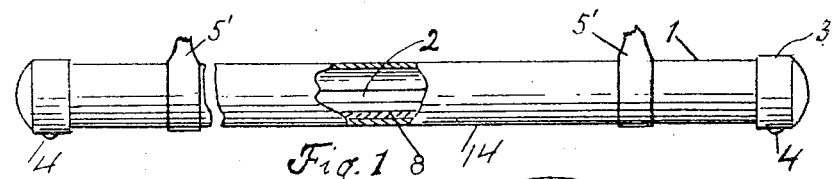
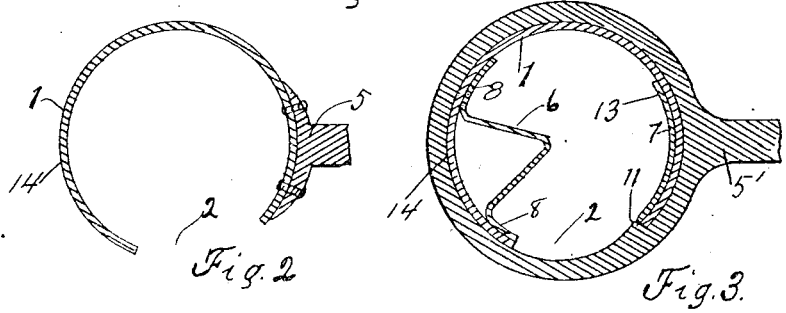
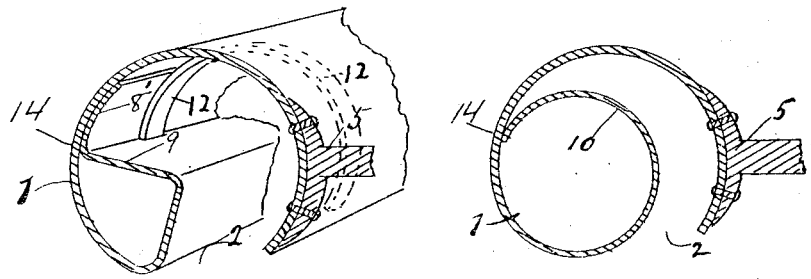
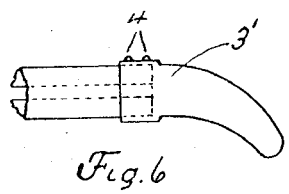
Huston Taylor
INVENTOR Patented Aug. 16, 1927.

1,639,011

UNITED STATES PATENT OFFICE.

HUSTON TAYLOR, OF DETROIT, MICHIGAN.

IMPACT BAR FOR AUTOMOBILE BUMPERS.

Application filed January 31, 1927. Serial No. 164,815.

My invention relates to a construction of an impact bar for automobiles which is in itself resilient.

My invention relates to an impact bar for automobiles, of an incomplete tubular construction, in which there is resiliency between the supporting and impact portions.

My invention relates to an impact bar for automobiles, consisting of a tube of resilient metal, open longitudinally, and means for reinforcing the impact, and supporting portions, also providing internal coils of springs to assist the resiliency of the external tube.

My invention further provides end portions, constructed to act with the resiliency of an automobile impact bar constructed of a tube of spring metal open longitudinally along the bottom.

I obtain these objects by the construction illustrated in the accompanying drawings in which—

Figure 1 is a top plan view of a fragmental impact bar for automobiles.

Figure 2 is a cross section elevation of a spring tubular bumper bar.

Figure 3 is a cross section elevation of a spring tubular bumper bar with external and internal reinforcement.

Figure 4 is a cross section elevation of a spring bumper bar showing reinforcement on the impact side and an internal spring reinforcement.

Figure 5 is a cross section elevation of a spring bumper bar, of more or less spiral design, having a complete tube inside of an incomplete tube.

Figure 6 is a fragmental portion of the bumper bar showing a different end construction.

Similar numerals refer to similar parts throughout the several views.

The bumper bar 1 in the several views is constructed of resilient sheet metal curved to give the appearance of a round tube. A longitudinal opening 2, is provided between the longitudinal edges of the sheet metal, to give space for movement between the front or impact side 14, and the back or supporting side of the bumper. Brackets 5, engage the supporting side of the impact bumper bar. In Figure 3, the supporting bracket encircles the spring tubular impact bar, for the purpose of not only supporting it but also for reinforcing it from without and holding it in place against its tendency to expand. An internal projection 11, of bracket 5′, assists in holding the tube in place against rotation. A reinforcement form of metal 6, engages the impact side 14, at 8, and another reinforcing segment of metal 13, engages the supporting side of the spring tubular bar. These engagements of the reinforcing shapes may be by welding or other convenient means. In Figure 1 end caps 3 engage to said bar by bolts 4.

In Figure 4 the reinforcement of the impact side 14, of the bumper bar is accomplished by folding portion 9, inwardly and flanging upward for engagement at 8′. Internal springs 12, may be secured within the tubular bar to assist the return of the said bar to normal position after the compression caused by an impact. In Figure 5 we have another variety of internal reinforcement of said spring bumper bar, by the completion or near completion of a round tube 10, inside of the incomplete circle of the outer bumper bar, on its impact side 14. The curved end fitting 3′, of Figure 6 encircles the end of the resilient bar and engages only the impact side, thus enabling it to move with the front or impact portion.

In the operation of my invention it will be observed that the side of the bumper near the vehicle does not travel toward the vehicle but remains in position while the resiliency of the bumper bar itself absorbs the shock of ordinary impacts.

It has an economic advantage over the usual constructions in that additional spring mountings are not necessary, but they may be added if desired. The installation of my invention of a new construction of bumper bar may be accomplished across the front or rear of a motor driven vehicle or in short lengths as fender protectors in the rear by appropriate brackets engaging the rigid portions of the frame of said vehicle.

I claim:—

1. An impact bar for motor driven vehicles, consisting of an elongated sheet of resilient metal curved transversely with the longitudinal edges spaced from each other.

2. An impact bar for motor driven vehicles, consisting of an elongated tube of resilient sheet metal, opened longitudinally providing for a resilient movement between the longitudinal edges of said sheet metal.

3. An impact bar for motor driven vehicles, consisting of an elongated curved channel of spring metal, having the opening of the channel downward, means for support ing said channel at intervals on one side near said opening.

4. An impact bar for motor driven vehicles, consisting of an elongated roll of spring metal, said roll open at the bottom, means for supporting said roll on the side opposite the side designed to receive impact.

5. An impact bar for an automobile bumper consisting of an elongated sheet of spring steel, so rolled or shaped and the longitudinal edges so opened at the bottom that there is a spring action between the front or impact side and the rear or supporting side.

6. An impact bar for motor driven vehicles consisting of an elongated sheet of spring steel rolled with the free edges downward providing reinforcement of the impact side of said bar substantially as set forth.

7. An impact bar for motor driven vehicles consisting of an elongated sheet of spring steel transversely rolled, brackets for holding said rolled sheet in form by encircling the same at the end portions.

8. An impact bar for motor driven vehicles comprising a sheet metal member having a portion thereof adapted to be fixed to and to extend across a vehicle and another inherently resilient portion extending substantially the length of said first named portion and transversely yieldable with respect thereto.

9. An impact bar for motor driven vehicles comprising a sheet metal member having a portion thereof adapted to be fixed to the vehicle and another inherently resilient portion substantially longitudinally coextensive with said first named portion and transversely yieldable with respect thereto, said portions forming a bar that is tubular in appearance as ordinarily viewed when in operative position on the vehicle.

10. An automobile bumper comprising rigid end brackets and an inherently resilient sheet metal impact bar having its ends telescoped within said brackets in such manner that undue expansion of the bar is prevented while permitting the contraction of the bar under conditions encountered in service.

11. An impact bar comprising an elongated sheet of resilient metal with a section thereof curved transversely and with the longitudinal edges thereof resiliently movable with relation to each other.

HUSTON TAYLOR.